(12) United States Patent
Speranza et al.

(10) Patent No.: US 6,797,914 B2
(45) Date of Patent: Sep. 28, 2004

(54) JOINING WORKPIECES BY LASER WELDING WITH POWDER INJECTION

(75) Inventors: Joseph James Speranza, Rochester Hills, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/359,019

(22) Filed: Feb. 5, 2003

(65) Prior Publication Data

US 2004/0074882 A1 Apr. 22, 2004

Related U.S. Application Data

(63) Continuation-in-part of application No. 10/273,691, filed on Oct. 19, 2002.

(51) Int. Cl.[7] .............................................. B23K 26/24
(52) U.S. Cl. ................................... 219/121.64; 228/244
(58) Field of Search ......................... 219/121.6, 121.63, 219/121.64, 121.65, 121.66, 121.84, 121.85; 228/208, 244, 248.1

(56) References Cited

U.S. PATENT DOCUMENTS

| | | | | |
|---|---|---|---|---|
| 4,752,537 A | * | 6/1988 | Das | 428/614 |
| 5,474,227 A | * | 12/1995 | Krengel et al. | 228/147 |
| 5,486,676 A | * | 1/1996 | Aleshin | 219/121.63 |
| 6,593,540 B1 | * | 7/2003 | Baker et al. | 219/121.63 |
| 6,605,795 B1 | * | 8/2003 | Arcella et al. | 219/121.63 |

FOREIGN PATENT DOCUMENTS

JP             401162587 A   *   6/1989

* cited by examiner

Primary Examiner—Samuel M. Heinrich
(74) Attorney, Agent, or Firm—Kathryn A. Marra

(57) ABSTRACT

A laser is used to melt portions of first and adjacent workpieces to form a weld. As the laser melts the workpieces, a powdered metal is injected into the molten metal pool. The powdered metal improves the strength of the weld by providing additional weld volume to bridge any preexisting gaps between the workpieces. The molten metal is then cooled to form a weld between the workpieces. For welding galvanized steel or metals with coatings or alloy materials having a lower vaporizing temperature, a powdered metal is used that reacts with the lower temperature metal to form an alloy that avoids vaporization during welding, thereby reducing weld porosity and weld spatter.

14 Claims, 2 Drawing Sheets

JOINING WORKPIECES BY LASER WELDING WITH POWDER INJECTION

This application is a CIP of Ser. No. 10/273,691 filed Oct. 19, 2002.

TECHNICAL FIELD

This invention relates to laser welding and, more particularly, to methods of joining multiple workpieces using a laser and added powdered metal to create a low porosity weld and/or fill in gaps between workpieces.

BACKGROUND OF THE INVENTION

Laser welding when used to join metal workpieces, forms a "keyhole" of vaporized metal through which the laser beam heats and melts portions of a first and adjacent workpieces. If the workpieces contain metals having different melting points, either as coating or as an alloy, vaporization of the low melting temperature metal or coating will occur while the steel, or other metal substrate is melting. The vapor created may then become trapped as the molten metal is cooled creating porosity and voids in the weld between the workpieces. In addition, if a gap exists between the workpieces, the volume of the molten weld pool may not be adequate to bridge the gap between the workpieces, resulting in a discrepant weld.

SUMMARY OF THE INVENTION

The present invention provides an improved method of laser welding using an injector to dispense powdered metal into the molten weld pool. The method is useful for welding coated metals, such as galvanized steel, and for welding workpieces having gaps between the workpieces along the weld seam. During welding, the laser locally heats up the workpieces, forming a keyhole creating molten metal through the first workpiece and into the adjacent workpieces.

In the case of galvanized steel or other metals containing a lower melting temperature metal, the zinc or other metal may vaporize while the steel or other metal substrate is being melted by the laser. The vapor may then be trapped in the weld, resulting in a low quality porous weld.

To avoid this, powdered metal is injected into the molten weld pool. A powdered metal is selected which has an affinity for the lower melting temperature metal. As the powdered metal is injected into the molten weld pool, heat from the molten metal and the laser beam melt the powder. As the powder melts, it forms a chemical or metallurgical bond with the lower melting temperature metal, creating an alloy having a higher vaporization temperature. Increasing the vaporization temperature reduces vapor formation, thereby avoiding weld porosity and spatter.

In the case of workpieces having excessive gaps between them, the workpiece metal melted by the laser may be inadequate to bridge the gaps and form a weld connecting the workpieces. To avoid this, powdered metal is injected into the molten weld pool. The powdered metal may be similar to the metal of the workpieces or, if either of the pieces is coated, may be selected to react with the coating as well. In either case, the powdered metal increases the volume of the molten metal, which can be used to bridge the gaps between the workpieces. Finally, the molten metal is cooled to form a weld, free of porosity and filling any gaps between the workpieces.

These and other features and advantages of the invention will be more fully understood from the following description of certain specific embodiments of the invention taken together with the accompanying drawings.

DESCRIPTION OF THE PREFERRED EMBODIMENT

Figure 1:
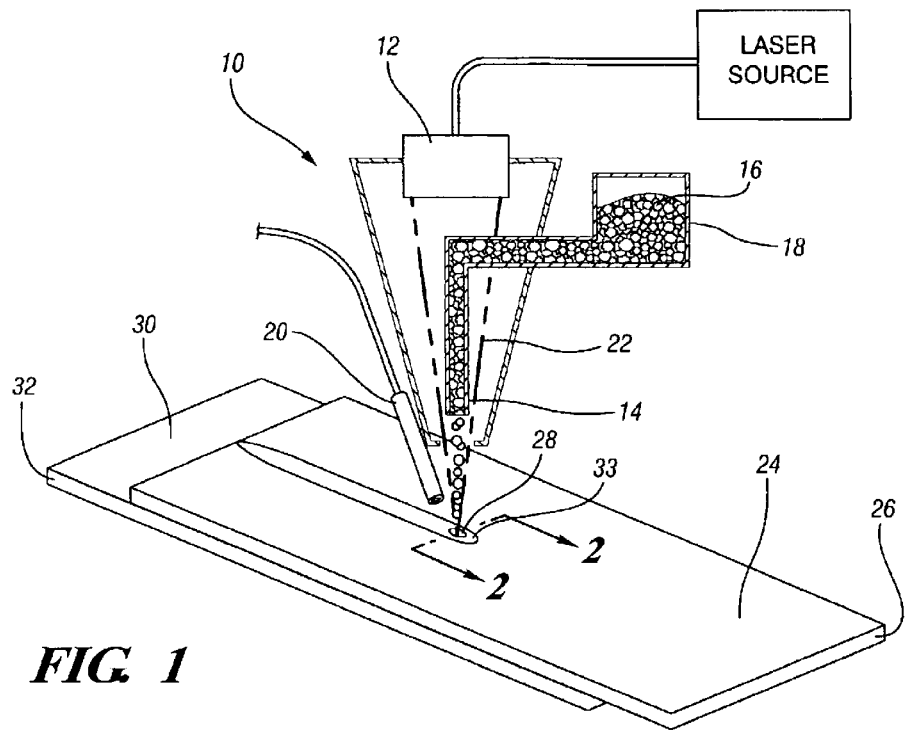
FIG. 1 is a schematic pictorial view illustrating the laser welding method according to the invention.
Figure 2:
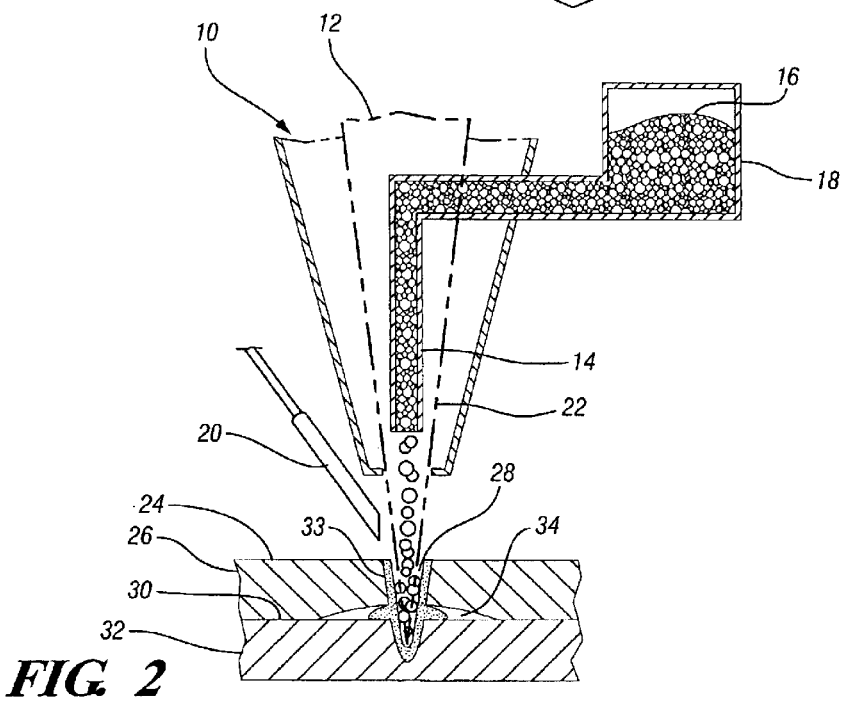
FIG. 2 is a cross-sectional view from line 2—2 of FIG. 1, showing an intermediate stage in laser welding together two workpieces having excessive gaps between their facing surfaces.

Referring first to FIGS. 1 and 2 of the drawings in detail, numeral 10 generally indicates a laser welding apparatus including a laser 12 associated with an injector 14 for injecting metal powder or alloy 16. The injector may include a hopper 18 to contain the powered metal 16. Alternatively, the powdered metal 16 may be supplied from an external source. The injector 14 preferably uses a non-reactive or inert compressed gas to propel the powdered metal 16.

A shielding gas 20 may be discharged onto the weld site to prevent the formation of oxidation at the weld. If desired, the shielding gas 20 may be used to propel the powdered metal 16 and also provide the shielding function.

In operation, the laser 12 projects a beam 22 to melt an exposed surface 24 of a first workpiece 26. As the surface 24 melts, the beam 22 forms a keyhole 28 through which it penetrates the first workpiece 26 to an unexposed surface 30 of a second workpiece 32. In accordance with the invention, powdered metal 16 is injected into a molten weld pool 33 where it is melted and mixed with the molten metal.

FIG. 2. shows the apparatus 10 in use in a method of laser welding two metal workpieces having portions separated by a gap 34. The laser 12 projects a focused beam 22 that heats the exposed surface 24 of the first workpiece 26. As the metal heats up, a keyhole 28 is formed by the beam 22. A powdered metal 16 is injected into the keyhole 28. As the powdered metal 16 is injected into the molten weld pool 33, heat from the melted metal and the beam 22 melt the powdered metal 16. The powdered metal increases the volume of the molten metal, which is used to bridge preexisting gaps 34 between the workpieces in order to produce a strong weld.

As the exposed surface 24 of the first workpiece 26 melts, the beam 22 penetrates through the first workpiece 26 into any gaps 34 between the first and adjacent workpieces 26, 32. Similarly, this method can be used to fill gaps between multiple adjacent workpieces.

During this time, the beam 22 melts the unexposed surface 30 of the second workpiece 32 to increase the depth of the weld. After reaching the desired depth, the laser 12 is moved in a direction to lengthen the weld. Once the desired length is reached the laser is turned off, allowing the molten metal to cool. The cooled metal forms a weld, bridging the gaps and joining the workpieces together.

Figure 3:
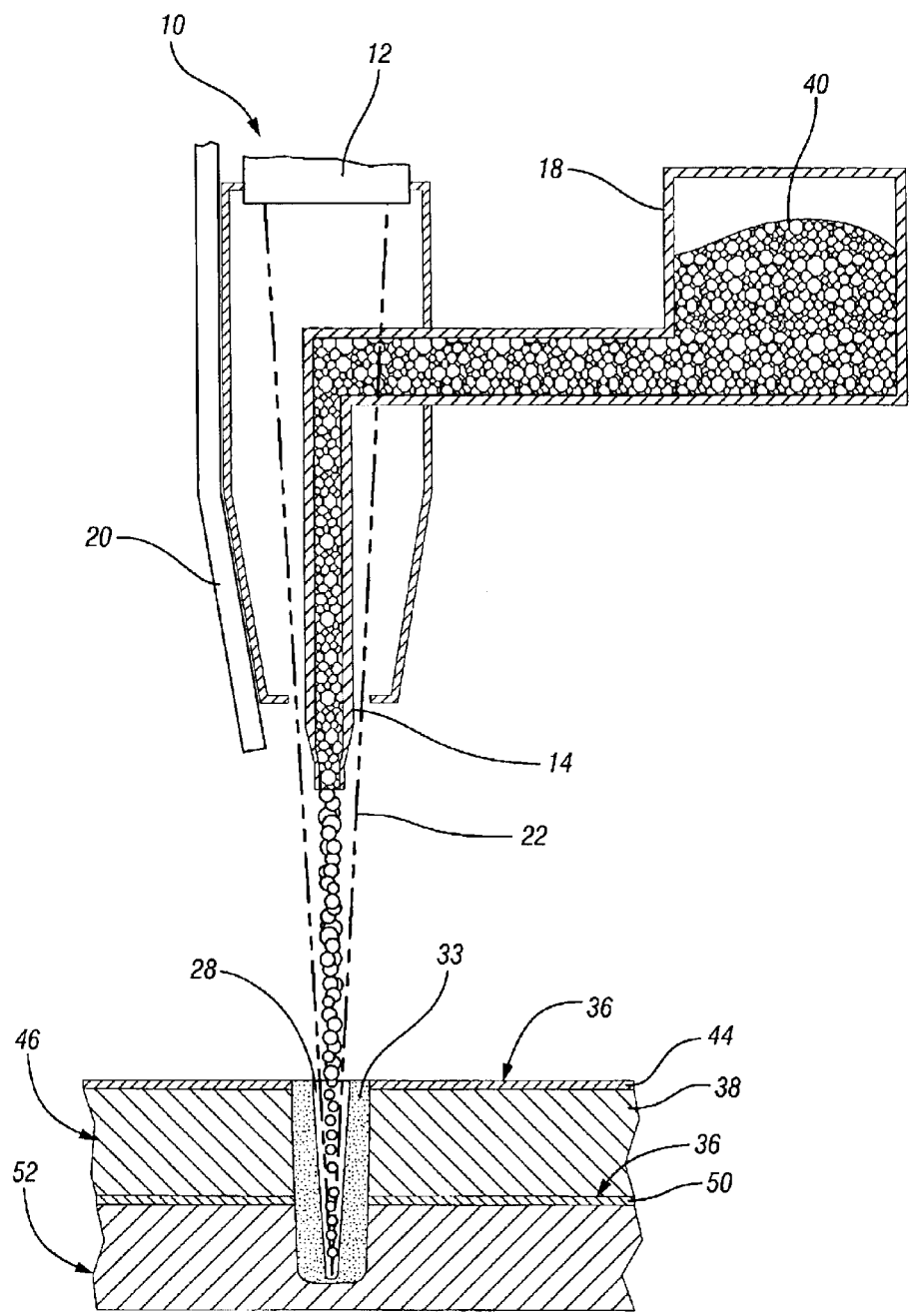
FIG. 3 is a cross-sectional view similar to FIG. 2 but showing an intermediate stage of laser welding together two workpieces, one having a galvanized zinc coating.

FIG. 3. shows the apparatus 10 in use in a method of laser welding two workpieces, where one of the workpieces has a metal coating 36 having a vaporization temperature lower then the melting temperature of the inner metal layer 38, similar to galvanized steel. With galvanized steel, the vaporization temperature of the zinc coating is lower than the melting temperature of the steel.

To prevent the formation of zinc vapor when welding galvanized steel, a powdered metal 40 having a high affinity for zinc should be injected into the molten weld pool 33. Copper is a desirable constituent of such a metal because of its high affinity for zinc, and its ability to form a zinc alloy having a higher vaporization temperature. Other metals having a high affinity for zinc and also capable of forming a zinc alloy having a higher vaporization temperature may be substituted if desired. Additional metal may also be injected into the weld to increase weld volume. The additional weld volume can be used to bridge gaps between the workpieces to be joined.

When laser welding galvanized steel, the beam 22 first melts the exposed outer layer 44 of the first workpiece 46. Heat from the beam 22 vaporizes the exposed outer layer 44, allowing the beam 22 to melt the inner metal layer 38 of the first workpiece 46. As the inner metal layer 38 heats up, a keyhole 28 is formed by the beam 22 which penetrates through the unexposed outer layer 50 of the first workpiece 46. A powdered metal 40 including copper and/or other metal, is injected into the molten weld pool 33 to stabilize the molten metal and alloy with the zinc. The keyhole 28 allows the powdered metal 40 to contact the unexposed layer 50. The heat from the molten metal and the beam 22 cause the powdered metal 40 to melt and bond with the unexposed outer layer 50.

As a result, the zinc and the copper form a new metal alloy, having a higher vaporization temperature, which reduces vaporization and the formation of porosity in the weld. The powdered metal, also increases the volume of the molten metal. The increased volume fills gaps between the first and second workpieces. The beam 22 then melts the second workpiece 52 until the desired depth is reached. After reaching the desired depth, the laser is moved in a direction to lengthen the weld. Once the desired length is reached the laser is turned off and the molten metal is allowed to cool. Cooling the molten metal forms a weld, free of porosity, between the first and second workpieces.

The foregoing description is directed, as an example, to joining steel workpieces with a laser and powdered metal. However, it should be understood that other fusible metals may be joined using the same process with a proper selection of compatible metals. Thus, other metals may also be successfully joined with a laser and powdered metal within the guidelines above described.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of joining first and adjacent fusible metal workpieces at a point of engagement, wherein at least one of the fusible workpieces has a metallic substrate coated with a material having a vaporizing temperature lower than that of the substrate, the method comprising the steps of;

provinding a welding laser and an injector for injecting powdered metal;

welding the workpieces at the point of engagement with the laser to create molten metal between the workpieces;

injecting a metal powder into the molten metal pool created by the laser, thereby introducing additional metal to the weld; and cooling the molten metal to form a weld between the workpieces.

2. A method as in claim 1 including flowing a shielding gas into the weld area to prevent oxidation of the workpieces.

3. A method as in claim 1 wherein the powdered metal is an alloy that reacts with the coating to reduce vapor formation, thereby minimizing porosity and weld spatter.

4. A method of joining first and adjacent fusible metal workpieces at a point of engagement, wherein at least one of the fusible workpieces includes a base metal and an alloy material having a vaporizing temperature lower than that of the base metal, the method comprising the steps of;

providing a welding laser and an injector for injecting powdered metal;

welding the workpieces at the point of engagement with the laser to create molten metal between the workpieces;

injecting a metal powder into the molten metal pool created by the laser, thereby introducing additional metal to the weld; and cooling the molten metal to form a weld between the workpieces.

5. A method as in claim 4 wherein the powdered metal is an alloy that reacts with the alloy material to reduce vapor formation, thereby minimizing porosity and weld spatter.

6. A method of joining first and adjacent fusible metal workpieces at a point of engagement wherein at least one of the workpieces is a galvanized steel, the method comprising the steps of;

providing a welding laser and an injector for injecting powdered metal alloy;

welding the workpieces at the point of engagement with the laser to create molten metal between the workpieces;

injecting a powdered metal alloy into the molten metal pool created by the laser, the powdered metal having an affinity for zinc and reacting therewith to form a new alloy that limits vaporization of the galvanized coating during the welding; and cooling the molten metal to form a low porosity weld between the workpieces.

7. A method as in claim 6 including flowing a shielding gas into the weld area to prevent oxidation of the workpieces.

8. A method of joining first and adjacent fusible metal workpieces at a point of engagement having excessive gaps between the workpieces, the method comprising the steps of;

providing a welding laser and an injector for dispensing powdered metal;

welding the workpieces at the point of engagement with the laser to create molten metal between the workpieces;

injecting sufficient powdered metal into the molten metal pool through a keyhole created by the laser to bridge existing gaps between the workpieces by locally increasing the amount of molten metal; and cooling the molten metal to form a weld bridging the gaps between the workpieces.

9. A method as in claim 8 including flowing a shielding gas into the weld area to prevent oxidation of the workpieces.

10. A method as in claim 8 wherein at least one of the fusible workpieces has a metallic substrate coated with a material having a vaporizing temperature lower than that of the substrate.

11. A method as in claim 10 wherein one of the fusible workpieces is galvanized steel.

12. A method as in claim 11 wherein the powdered metal is an alloy that reacts with the galvanized steel coating to create a new alloy, thereby minimizing porosity and weld spatter.

13. A method as in claim 8 wherein at least one of the fusible workpieces includes a base metal and an alloy material having a vaporizing temperature lower than that of the base metal.

14. A method as in claim 4 including flowing a shielding gas into the weld area to prevent oxidation of the workpieces.

* * * * *